(12) United States Patent
Zhang et al.

(10) Patent No.: US 11,836,746 B2
(45) Date of Patent: Dec. 5, 2023

(54) AUTO-ENCODER ENHANCED SELF-DIAGNOSTIC COMPONENTS FOR MODEL MONITORING

(71) Applicant: FAIR ISAAC CORPORATION, San Jose, CA (US)

(72) Inventors: Jun Zhang, San Diego, CA (US); Scott Michael Zoldi, San Diego, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 744 days.

(21) Appl. No.: 14/558,700

(22) Filed: Dec. 2, 2014

(65) Prior Publication Data
US 2016/0155136 A1 Jun. 2, 2016

(51) Int. Cl.
*G06Q 30/0201* (2023.01)
*G06N 5/045* (2023.01)
*G06N 3/045* (2023.01)
G06N 20/00 (2019.01)
G06N 3/08 (2023.01)

(52) U.S. Cl.
CPC ......... *G06Q 30/0201* (2013.01); *G06N 3/045* (2023.01); *G06N 5/045* (2013.01); G06N 3/08 (2013.01); G06N 20/00 (2019.01)

(58) Field of Classification Search
None
See application file for complete search history.

(56) References Cited

U.S. PATENT DOCUMENTS

| | | | |
|---|---|---|---|
| 8,027,439 B2 | 9/2011 | Zoldi et al. | |
| 8,041,597 B2 | 10/2011 | Li et al. | |
| 8,346,691 B1* | 1/2013 | Subramanian | G06N 3/08 706/15 |
| 2003/0028502 A1* | 2/2003 | Lambert | G06F 17/18 |
| 2004/0101043 A1* | 5/2004 | Flack | H04N 5/85 375/240.01 |
| 2007/0094067 A1 | 4/2007 | Kumar et al. | |
| 2007/0254295 A1* | 11/2007 | Harvey | C12Q 1/6886 435/6.18 |
| 2008/0312979 A1* | 12/2008 | Lee | G06Q 10/063118 705/7.28 |
| 2009/0132450 A1 | 5/2009 | Schlottmann | |

(Continued)

OTHER PUBLICATIONS

Carreira-Perpinan, 2001. Continuous Latent Variable Models for Dimensionality Reduction and Sequential Data Reconstruction. Ph.D. thesis. University of Sheffield, UK 2001.*

(Continued)

*Primary Examiner* — Richard N Scheunemann
(74) *Attorney, Agent, or Firm* — Mintz Levin Cohn Ferris Glovsky and Popeo, P.C.

(57) ABSTRACT

A diagnostic system for model governance is presented. The diagnostic system includes an auto-encoder to monitor model suitability for both supervised and unsupervised models. When applied to unsupervised models, the diagnostic system can provide a reliable indication on model degradation and recommendation on model rebuild. When applied to supervised models, the diagnostic system can determine the most appropriate model for the client based on a reconstruction error of a trained auto-encoder for each associated model. An auto-encoder can determine outliers among subpopulations of consumers, as well as support model go-live inspections.

15 Claims, 5 Drawing Sheets

(56) References Cited

U.S. PATENT DOCUMENTS

| | | | | |
|---|---|---|---|---|
| 2009/0192867 | A1* | 7/2009 | Farooq | G06Q 10/06 705/7.29 |
| 2011/0166979 | A1* | 7/2011 | Zoldi | G06Q 10/0635 705/35 |
| 2013/0204755 | A1 | 8/2013 | Zoldi et al. | |
| 2014/0201126 | A1 | 7/2014 | Zadeh et al. | |

OTHER PUBLICATIONS

Liroz-Gistau, M. et al. (Aug. 28, 2013). "Data Partitioning for Minimizing Transferred Data in MapReduce," International Conference on Financial Cryptography and Data Security, [Lecture Notes In Computer Science, Lect. Notes Computer], Springer, Berlin, Heidelberg, pp. 1-12.

Bengio, Yoshua. *Learning Deep Architectures for AI.* Foundations and Trends in Machine Learning. vol. 2 No. 1 (2009) pp. 1-127.

Hinton, G.E. and R.R. Salakhutdinov. "Reducing the Dimensionality of Data with Neural Networks." *Science*.vol. 313. No. 5786. (Jul. 28, 2006):pp. 504-507. Web. Date accessed—Jan. 16, 2018.

Ranzato, Marc' Aurelio and Martin Szummer. "Semi-supervised Learning of Compact Document Representations with Deep Networks". *International Conference on Machine Learning* (ICML 2008). Helsinki, Finland, (2008):pp. 792-799.

* cited by examiner

AUTO-ENCODER ENHANCED SELF-DIAGNOSTIC COMPONENTS FOR MODEL MONITORING

TECHNICAL FIELD

The subject matter described herein relates to analytical models, and more particularly to auto-encoder enhanced self-diagnostics for model monitoring.

BACKGROUND

A model is a mathematical equation that is derived based on the specific patterns of data contained within historical training data. As implemented as a computer system, a model or an analytic model summarizes patterns or regularities mathematically in massive data, and it can classify the new observation into different categories with use of these patterns or regularities. In certain applications, such as fraud detection and other types of analytics, a model can be utilized to learn subtle patterns from historical data to determine in the areas of fraud whether a data record is more likely to be fraudulent or more likely to be non-fraud based on the millions of data patterns utilized to learn the unique characteristics of fraud and non-fraud data utilizing a computer learning algorithm. These models cannot be learned without the use of computerized methods based on the complex computer algorithms and huge volumes of data that need to be utilized in training the model.

Models can be used to calculate likelihood that a particular sample will exhibit a specific pattern. In fraud detection, for example, one or more models can be built on large amounts of payment account data, and provide the likelihood that an account associated with a transaction has been used fraudulently. Each model helps to detect fraud early and prevent further fraud loss. The model is built from data through a learning algorithm.

During development and building of a model, implicit assumptions are made around the model's applicability to the anticipated production environment. Model development can be broadly described in two different classes: supervised models and unsupervised models. Supervised models are models where one has historical data and modeling tags (i.e., good/bad identifiers attached to data records), and the models are built under the assumption that the production data will resemble the historical data and the events or patterns to be detected, which are indicated by the good and bad tags, will remain similar. Unsupervised models typically do not have any modeling tags and may have very little historical data on which the model is produced, or potentially may be built on synthetic data. Both types of models pose interesting challenges in monitoring the operational behavior of the models, and for using models in production applications and making business decisions.

Monitoring the operational behavior of models is important, and a large part of a model governance process. When supervised models are utilized, and examples of good and bad data are available, the model can be examined to see if it has the same detection capabilities. For example, in the case of fraud model monitoring, one can look to see if a fraud detection model continues to have the same fraud detection capabilities of differentiating fraud examples from non-fraud examples. In the field of fraud detection, unfortunately, fraud tagging is often delayed for up to 90 days, so there is a lag of reporting model performance data which has a negative business impact and looking at model performance may not identify subpopulations where the model is failing compared to subpopulations where the model is still performing. In unsupervised models, there is no baseline of model performance with which to compare, and score distribution could be the only one metric on which to focus. Other metrics in monitoring supervised models and unsupervised models is to look at snapshots of the data quality and whether there are shifts in the statistics. However, determining which shifts are most relevant is mostly imprecise and lacks a global measurement.

When models are built with historical data, the model is fixed with modeling parameters. In fraud modeling, fraud patterns and legitimate cardholders' spending patterns are constantly evolving—for all models this property is challenging where there is a desired outlier behavior that the model is attempting to detect may change over time. Therefore, the "fixed" model in terms of model variables/features may begin to perform non-ideally in an evolving environment and begin to show signs of degradation in production. There needs to be an analytic component that can diagnose the changing environment and provide an indication on the model suitability on the production data, or sub-populations of data.

This can be particularly challenging for unsupervised models. While the unsupervised model is running in production, it is difficult to keep track of the model performance without collecting a large amount of tagged data for performance analysis. This analysis depends on whether outcome data is available. This outcome data may be very rare, such as in the case of Cyber Security, or often delayed due to delays in obtaining tags. In one example, it typically takes up to 90 days to get suitable fraud reporting on payment card data. Sometimes tag information is not even provided, and so a measurement of model detection performance is not available. Therefore an analytic measurement on the data is needed, which can monitor raw production data and derived features to determine the suitability of the model on the current production data being sent to the model and which can apply to both supervised and unsupervised models. Such analytic measurement can also signal the need for model rebuild and/or the need to specially treat segments of customers or data that are new to the model from which it was developed.

Supervised models are built on historical data with high quality tags (or labels). As an example, a FICO Falcon® model uses a transaction profiling technology and a neural network model to score every transaction by a card/account, and provide a score that indicates the likelihood of the card/account being used fraudulently. Model training is done on historical payment account data and fraud information.

The class of supervised models includes consortium models. Consortium models are often used in areas such as fraud or credit risk where banks will pool their data together into a consortium data asset to build the most predictive model by accumulating as much tagged data as possible. The training data then contains a large pool of data collected from multiple clients. Consortium models have the benefit of observing more patterns from various clients and can improve the overall desired detection by the model. Consortium models are typically more robust and can generalize well in the production environment. In practice, fraud consortium models are built by selecting clients that are geographically close, with similar customer spending behaviors and similar fraud patterns.

For the consortium model to be effective, production data of the consortium model should resemble the historical data. Over time, there may be consortium clients or certain portfolios may become outliers and demonstrate distinct spending and fraud patterns from other peer clients in the region. It is important that such clients be identified, and that their data differences is understood, so that customized models can be provided for such clients to address shifts in data quality and new portfolios. Individual clients may deviate in the training data or from the consortium data assets, which is important to understand, particularly in the production environment.

The right model for a new client may also be a question, and often this has less to do with the model than with a similarity of the client's data to the data on which the model was developed. Yet another way to allow suitability of a model to be defined by similarity between model training data and data expected in production for the client. This allows an analytic determination based on patterns seen by an auto-encoder trained on the same training data as which the model was built, the data similarity can define the recommendation.

Model "go live" is when a developed model is implemented and configured to run in production and starts to score live transactions. In order to ensure an optimal model and rule performance, during go-live the model must be monitored by assessing the data availability and data quality. For example, in Falcon® model go-lives, anomalous data records and card profiles are identified in order to diagnose any associated data issues or transaction profile configuration issues. Card profiles are the derived features and variables that are utilized in the model, and need to be monitored in addition to monitoring the data as to their similarity to the training data. In go-live data validation, the quality of the field values in each production data feed is compared to the quality in the development data. Any serious data issues, such as missing values or wrong values, can be identified and communicated to clients for correction.

SUMMARY

This document describes auto-encoder technologies, and their use in monitoring how the data and derived features in the production environment are changing as compared to the historical data or synthetic data on which models are developed. Auto-encoders are a self-learning technology that takes input data and creates a model to reproduce the same data. Although counter-intuitive, the difference between the input and the output data provides an indication of whether or not the data on which the model was trained is faithfully reproduced by the auto-encoder. If not reproduced with precision, this can point to unseen data exemplars presented to the model in production that could invalidate the model's applicability for those transactions as the data deviates too far from the data on which the model was developed. This provides a powerful new way to monitor the suitability of the model in the production environment to newly-occurring data patterns and/or shifts, or data quality issues, or manipulation of data.

This document also describes the use of an auto-encoder technology to compare production data records and the derived features contained in the transaction profiles on which the model has been trained, to determine abnormality in the features as well as the raw transactions.

Further, this document describes an auto-encoder neural network to enhance the diagnostic capability of fraud detection models to deal with rich unlabeled data and profiles to monitor unsupervised models for an indication when rebuild of the model may be necessary, and to monitor multiple consortium clients on a consortium model to determine whether any clients are outliers in reconstruction error compared to their peers over time. Further still, the auto-encoder neural network can monitor reconstruction errors on clusters of data to determine types of transactions/services that are occurring and that were 'unseen' by the model, and hence their predictions require special review and consideration. Yet further still, the auto-encoder neural network can monitor the go-live state associated with profile reconstruction error to better ensure the features based on the data are aligned with the training data/features on which the model was developed.

This document describes a diagnostic system for model governance that can be used to monitor model suitability for both supervised and unsupervised models. When applied to unsupervised models, the system can provide a reliable indication on model degradation and recommendations on model rebuild. When applied to supervised models, the system can determine the most appropriate model for the client based on a reconstruction error of a trained auto-encoder for each associated model. In another aspect, the diagnostic system can determine the clients that are deviating significantly in reconstruction error than their peers, in order to investigate data quality issues and likely portfolio changes to provide an improved product for those clients. In yet another aspect, an auto-encoder is configured as a diagnostic component to support model go-live inspections, including inspecting production data feeds and validating cardholder profiles in production. The auto-encoder diagnostic component can provide further insight into subpopulations of customers or transactions that show higher reconstruction error. Through clustering, characteristic changes of behaviors can be understood, and specific strategies and rules treatment can be generated.

In one aspect, a system includes an analytics module implemented by one or more data processors, the analytics module receiving transaction data of one or more customers and comparing the transaction data with a model of transactional behaviors to determine a likelihood of a specific transaction or behavior of each of the one or more customers, the analytics module further generating a score representing the likelihood of the specific behavior based on a historical learning of the model. The system further includes a data extractor implemented by one or more data processors for extracting an original data sampling from the transaction data. The system further includes an auto-encoder implemented by one or more data processors, the auto-encoder receiving the original data sampling and calculating, in an online state or off-line state and using the model, one or more latent variables of the model for reconstructing the original data sampling with a reconstructed data set, the auto-encoder further calculating a reconstruction error for the model utilizing one or more new latent variables, the reconstruction error representing a deviation of the reconstructed data set from the original data sampling.

Implementations of the current subject matter can include, but are not limited to, systems and methods including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes auto-encoder technologies, and their use in monitoring how the data and derived features in the production environment are changing as compared to the historical data or synthetic data on which models are developed. Specifically, this document describes an approach using "auto-encoder" neural network to enhance the diagnostic capability of models. Auto-encoder technology is able to learn a neural network to reproduce the original input data and minimize the reconstruction error, and it offers a strong indication of whether the data on which the model was trained is faithfully reproduced.

The system and method described herein provide new diagnostic functionalities in the following categories: monitor model suitability as a question of data similarity through auto-encoder technology; utilize auto-encoder technology to determine when unsupervised models need attention as tags might not exist, and/or to determine when consortium clients deviate too much from the consortium data asset they were trained. Additionally, an auto-encoder can be used to determine, based on client data, what model is best suited according to reconstruction error of the trained auto-encoder for each associated model. An auto-encoder can also be used to determine clients on the consortium that are deviating in reconstruction error more than their peers, and to determine reasons why—data quality, changing portfolio, etc.

Finally, as described herein, an auto-encoder can be used to determine with production data or go-live data where pockets of reconstruction error is high, and clustering technology can be applied to determine the characteristics of these clients, profiles, and data—for example CHIP usage in a country that never used CHIP, other examples include APPLE PAY, subprime customers, corporate card usage on a model primarily on consumer cards, etc.

An auto-encoder is a particular type of neural network that is trained to encode an input x into a latent representation z, such that the input can be reconstructed well from the encoding z. The encoder can be interpreted as a single layer that creates a code z according to $z=\sigma(W_E x+b_E)$, where $W_E$ and $b_E$ are the encoding weights and bias, respectively, and $\sigma$ is the logistic function. The network also contains a decoder component that reconstructs the input x according to $x=W_D z+b_D$. The unsupervised learning consists of minimizing the reconstruction error, $E_R$, with respect to the encoding and decoding parameters, $W_E$, $b_E$, $W_D$, $b_D$ on a training set. This approach is illustrated in FIG. 1.

Typically, the encoding z is a lower dimension than the original input, resulting in the discovery of latent variables that capture the complex interactions of the original input. Latent variables, or "hidden" variables, are variables that are not directly observed from the data but are learned from the observable variables that can be directly created from input data (such as typical Falcon input variables or profile variables).

Figure 1:
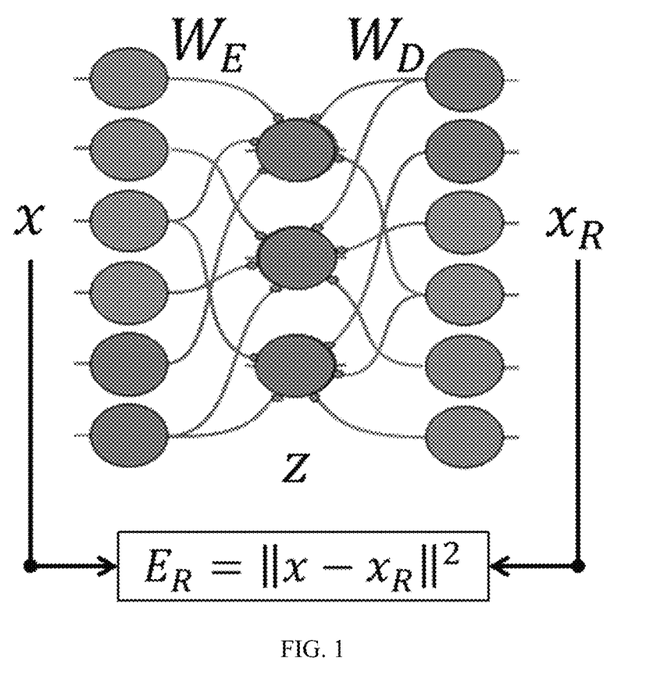
FIG. 1 illustrates a structure of an auto-encoder network.

As an example within the auto-encoder network illustrated in FIG. 1, the encoder layer z is the latent representation of the input layer x. Each node $z_i$, in the z is a latent variable, and it captures the complex interactions of the original inputs. Collectively, z is a lower dimension representation of the original inputs and this group of latent variables becomes a model for the data. An auto-encoder is an exemplary latent variable model, and that is configured to express all the input variables x in terms of a smaller number of latent variables z. Similarly in the neural network, a hidden layer is the latent representation, and each hidden node is a latent variable of its associated input variables. In the neural network model, the input variables have been converted to a hidden nodes representation through learned weights. The linearly inseparable pattern (like frauds) becomes easily separable in this hyperspace, represented by the hyper variables.

Each latent variable can only be learned from the data, and it is purely data driven and data specific. The latent variable cannot be manually created because it corresponds to abstract learning concepts that cannot be generalized through simple mathematical functions. One advantage of using latent variables is that it reduces the dimensionality of data. A large number of observable variables can be aggregated in a model to represent an underlying concept, making it easier to understand the data. In this sense, the latent variable serves as a hypothetical construct, and the latent variable is a higher level of representation and is more concise.

In a principal component analysis (PCA), as yet another example of latent variable creation, the latent variables are uncorrelated with each other, and capture most of the variance through eigenvalue decomposition of a covariance matrix of observed data. If there is one hidden layer with linear nodes, and the mean-squared error (MSE) is used as the loss function, the auto-encoder is equivalent to PCA with $z_i$ corresponding to the $i^{th}$ principal component of the data. However, when the hidden layer is nonlinear, this approach becomes a generalization of PCA, which is able to capture multi-modal aspects of the training data, and thus more complex latent variables.

Latent representation of the data sets utilized in model development can determine an extent to how well the latent model will reproduce data in a production environment. When the reconstruction error is too large, it is a clear indication that the "relationships" in the data are not consistent with the model training data. This is an important advance compared to the naïve methods used today in the model governance process which rely on delayed (fraud) tags, rough cuts at statistics of data, or raw variable statistics, but not the interrelationships and patterns across data elements which are summarized in the latent features of the model development data. These latent feature models point out data, and subsets of data, that do not have the same data patterns/relationships in the data on which the model was developed, and provide a real-time metric of misalignment of the model to the production environment. This is key for detecting model governance and model suitability issues for clients using models for production decisions.

In some implementations, an auto-encoder is trained in an unsupervised way, and encodes the input x into latent representation z, such that the input can be reconstructed back to $x_R$. Once the auto-encoder has been learned, the reconstruction error in the auto-encoder is a natural indicator of how representative the data has been in reflecting the original data set. When actual input data samples experience a strong deviation from original data used in learning the auto-encoder, the reconstruction error increases with this deviation.

As described above, unsupervised models are usually built with a large amount of transaction data (possibly synthetic data) but very limited tagging and where outlier behaviors are predicted as departures from normality. When the model is installed in production, the model structure and parameters are fixed. However, in production there can be constant evolving customer behaviors and fraud patterns. Although many unsupervised models are self-learning, such as self-calibrating models, it is necessary to occasionally redesign and rebuild these unsupervised models when significant environmental changes are reflected in the data.

Figure 2:
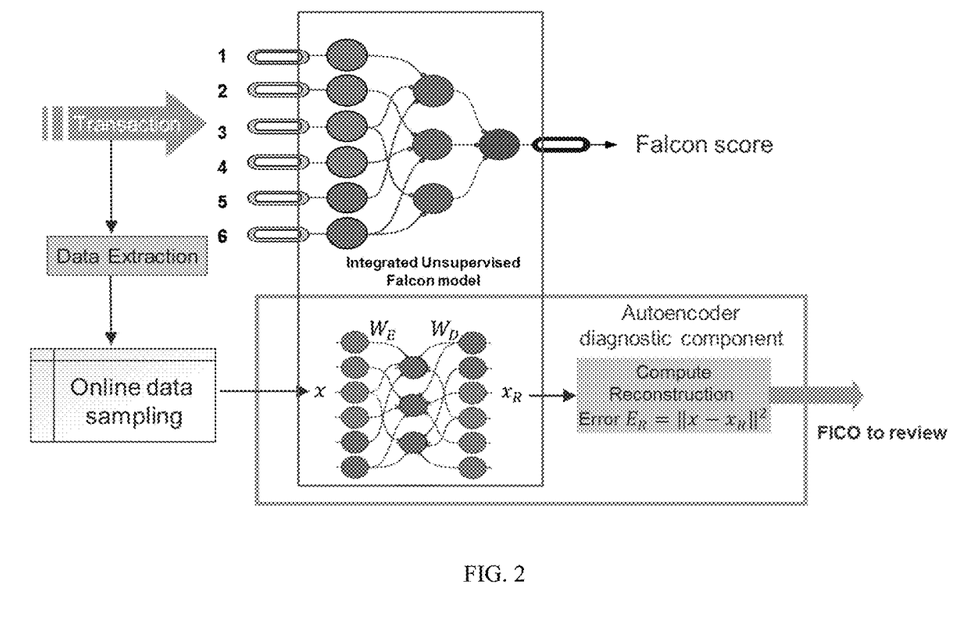
FIG. 2 illustrates an example of an auto-encoder diagnostic component integrated in a fraud detection unsupervised model.

Monitoring is done using a companion auto-encoder network based on the same data asset as the unsupervised model. Then the unsupervised model and the auto-encoder network is packaged together and installed in a production environment, as shown in FIG. 2. The auto-encoder network acts as a diagnostic component to regularly check a reconstruction error. This can be done through feeding the same production data to the auto-encoder and calculate the reconstruction error in a batch mode. In zero data situations, the auto-encoder can be built on a limited amount of production data, such as, for example, a first weeks' of production data, and then used to monitor deviations in the production data over time based on a production data baseline.

In some implementations, the accompanying auto-encoder shares the same modeling input data records with the unsupervised fraud detection model. During the model development phase, the unsupervised fraud detection model and auto-encoder network are designed and "learned" on the same data set. The auto-encoder is learned to minimize the loss function L, which is also the reconstruction error on the development data sets, as represented below:

$$f(x)=x_R$$

$$L(f(x))=\frac{1}{2}\Sigma_K(x^k-x_R^k)$$

The number of hidden nodes is optimized to provide sufficient latent representation of the input data. An under-complete hidden layer should be avoided to reduce a capacity of the auto-encoder to capture information from input space. Meanwhile, an over complete hidden layer should be avoided, to avoid over-fitting the development data and to avoid preventing the auto-encoder from extracting meaningful features and from generalizing in production.

In some implementations, in the production environment, while the model is scoring every transaction, the auto-encoder diagnostic component runs periodically to check the reconstruction error on a selected sampled data set. This is done through data extraction, which is fed into the auto-encoder network to compute the reconstruction error. This diagnostic component preferably runs in batch mode and can split the data to run in a MapReduce framework under a file system such as Hadoop file system. Because consortium data is usually large in volume, the MapReduce is deployed to compute the total reconstruction error using a parallel and distributed algorithm on a cluster. The Map procedure can sort the transaction data into partitions based on selection criterion, and the Reduce procedure is used to compute the auto-encoder reconstruction error for each partition, and then the total error is combined to expedite the computation. The advantage of this framework is to make full use of the distributed servers to improve scalability and fault-tolerance. This approach is also preferable when a client does not want the auto-encoder model running in parallel in production due to utilization of additional compute on the scoring server and can tolerate on-real-time evaluation of data suitability.

Error information is collected and utilized to understand shifts in the data and suitability of the production model and score with differences in production data. When the error reaches a threshold level globally, or on certain subpopulations of data locally, it is a strong signal that the unsupervised model may no longer be suitable for the production environment. Accordingly, the system will signal that the next version of the unsupervised model should be built on the newly collected data. Alternatively, the analysis of reconstruction error might point to types of customers and/or transactions about which the model is not performing as well, so that weights can be tuned, or rules and strategies can be used on changed or unseen data in production compared to the model development environment.

A consortium model is a model developed on data collected from multiple clients. Consortium pooled data allows the resulting model to benefit from patterns from various clients and can improve the overall model detection and model robustness. In the fraud practice, consortium models are built with selected clients that are geographically close and have similar customer spending behaviors and fraud patterns. The non-homogeneity of data contributors make for interesting governance and monitoring properties of consortium models on client data.

Reconstruction error in an auto-encoder can be used in analytic systems' models to monitor multiple consortium clients on the consortium model. This can help to identify any clients that are far outliers from the perspective of reconstruction error compared to their peers both in the development of the model and in the monitoring of the amount of deviation of the data in production while the model is deployed. This identification is important to the production consortium models, because it can provide valuable information on the model suitability for the individual consortium clients and point to customers that are deviating from their peers in terms of transaction behaviors. The purpose of monitoring consortium clients is to identify outliers which may indicate the current consortium model is not a suitable model for the client.

Figure 3:
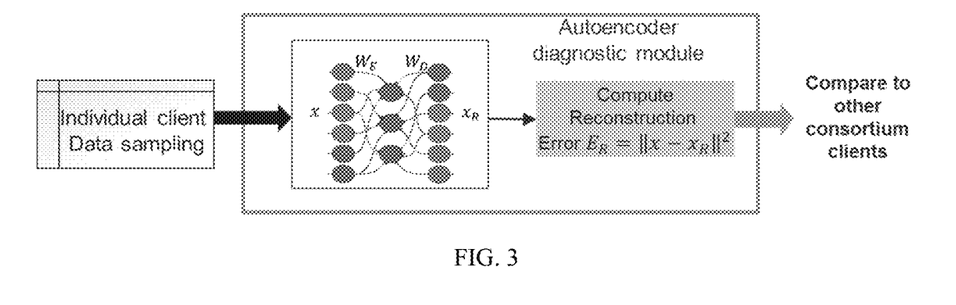
FIG. 3 illustrates a standalone auto-encoder diagnostic module for a consortium model.

The diagnostic auto-encoder network is learned with the consortium model, and in some implementations can be a standalone diagnostic module only for testing purpose. When the need arises, individual client data can be sampled and sent to the diagnostic module, the data will be transaction data without labels. The diagnostic module computes the reconstruction error. As illustrated in FIG. 3, the total error of a client is normalized and compared with the error percentile of the whole consortium client population. When the error is above the $90^{th}$ percentile of the consortium population or some other threshold, the client's data is demonstrating distinctive patterns that are outliers to the consortium model, and may not be suitable to be scored by this consortium model. This allows clients to be rank-ordered and provides deviations in suitability of the model.

In some instances, several candidate consortium models are available, and a decision must be made as to which one is the appropriate model for certain client. The same process as above can be used to send the data through multiple auto-encoder diagnostic modules to check the percentile of the error term from the total loss function. Based on the diagnostic outcomes, the best suitable model can be decided for this specific client. With this diagnostic mechanism, better recommendations can be provided for existing consortium clients as well as new clients to utilize the model best designed to resemble their production data, and to obtain optimal model performance and improve client satisfaction.

Another use of the auto-encoder technology is monitoring the model deployment process and ongoing monitoring. Models "go live" when the models are implemented and configured to run in production and start to score transactions. When a model is "going live", it must be ensured that the data meets data specification/statistics—typically referred to as data validation—but also focus on the similarity of the data in the production data at go-live with that of the historical data.

Further, models typically do not work on raw data, but rather on derived features. Therefore, the feature vectors that are utilized by the scoring model can be compared as well, since they accumulate more useful aggregated patterns than individual data transactions. For example, cardholder transaction profiles in a fraud detection system are created to keep track of each cardholder's spending patterns. Cardholder profiles are individualized to each cardholder and are updated and stored with each transaction. Scores are then calculated based on current cardholder's transactions and their individualized, derived feature vectors. Further by looking at model features, it can be determined whether a set of variable values associated with customers have existed before in the space of values presented to the model during the model training.

In some implementations, the auto-encoder network can be used to monitor go-live raw data and derived feature vectors when a new model is installed or a model is upgraded during the model go-live. This can significantly expedite the go-live testing associated with model deployment and identify data and behavioral pattern issues early, and in many cases identify the root cause of issues based on clustering transactions and customers that have big reconstruction errors.

In contrast to conventional techniques for monitoring model suitability, in which human modeling teams spent large amounts of time generating statistics on profiles and data feeds, and looking at global statistics versus targeting areas of large reconstruction errors that can point to customers and data that are poorly generalized in the model, the auto-encoder helps to diagnose the anomaly in the features and data feeds as it treats the profiles and data in a different perspective. Many of the interactions between profiles and data fields can be captured through latent representation in the hidden layer. The auto-encoder reconstructs the profile and data values from the network originally trained on the historical data. Any insignificant deviation from the profile values or data feeds itself can be checked in this reconstruction process.

Figure 4:
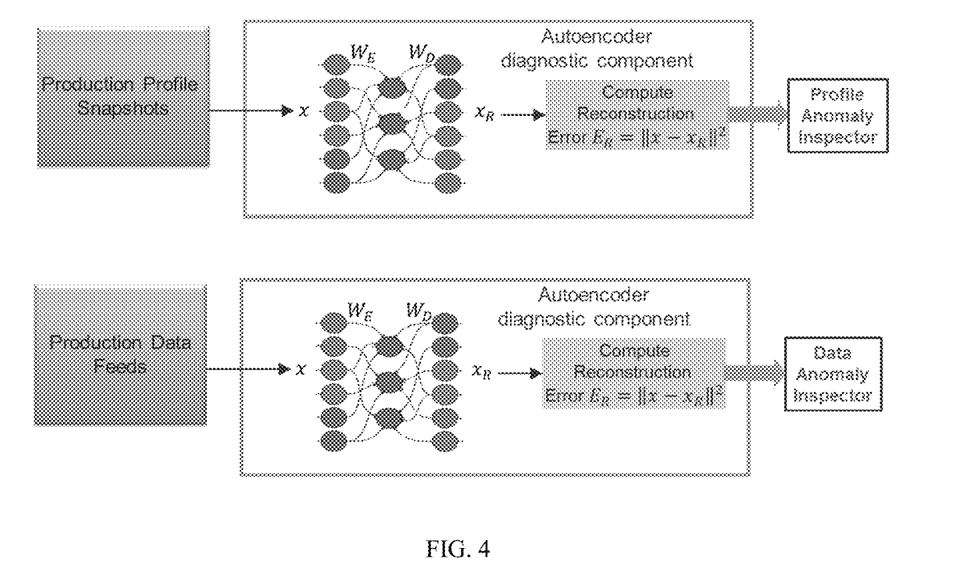
FIG. 4 illustrates a standalone auto-encoder diagnostic module for production data feeds and profiles.

In some implementations, two auto-encoder networks are provided to support the model go-live inspections. As shown in FIG. 4, one auto-encoder is trained with historical data feeds and used to inspect the production data feeds, while the other auto-encoder is trained with historical cardholder profiles and used to validate the cardholder profiles in production.

These auto-encoder networks monitoring the production data and feature vectors are of critical importance in go-live monitoring of new models, but the same modules can continue to perform ongoing monitoring of the production data and derived features, looking for drifts and changes in customer transaction behaviors over time.

Figure 5:
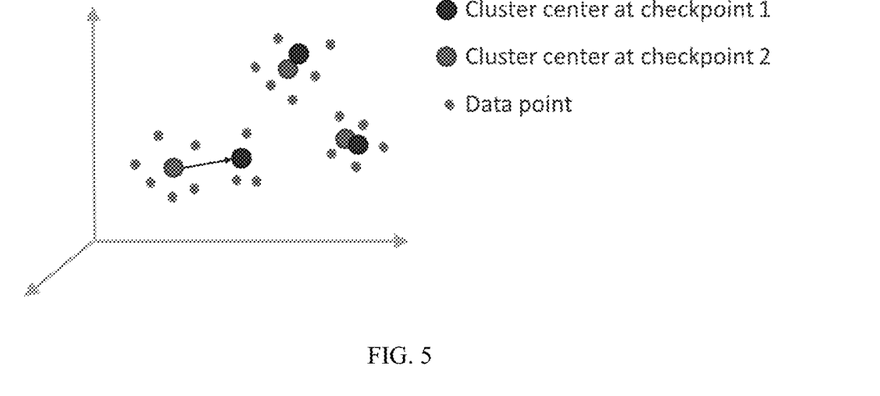
FIG. 5 is a chart showing clusters of large reconstruction errors and shifts over time.

Not all transactions or feature vectors will have the same uniform reconstruction error. Some will have large errors that might point to subpopulations of customers or transaction patterns that are poorly generalized in the production models given that they were not existent in the historical data on which the model was trained. Therefore an anomaly inspector and/or a clustering module can be provided to test commonality in outliers of transactions, customers and profiles with large reconstruction error. The anomaly inspector can identify causes of data and profile anomalies with large auto-encoder reconstruction errors to understand the root cause. When these similarities in clusters of behaviors are understood, remediation can be taken to target these data/customers with different strategies and rules-based treatments, since the model may not be as ideal as it had not received such similar data in training. The clustering module creates clusters around cardholders and cardholder profiles with large reconstruction error. The cluster centers of these outliers are tracked at each checkpoint—the clusters themselves point to like behaviors associated with the large reconstruction error. For example, in FIG. 5 three red dots are shown that represent three types of customers that have large reconstruction error but within each cluster the customers resemble each other. These clusters can then be assigned a meaning, which provides an opportunity to address a strategy of how to deal with each cluster. The system can also show how these clusters move over time, represented as grey dots in FIG. 5 and track the cluster centers shift over time in different checkpoints. This can reflect a need to revisit strategies or a need to retrain the model.

The same reconstruction error can be used to denote how well the transaction data or profiles can be reconstructed through the auto-encoder's decoding process. When a significant increase in reconstruction error globally is observed, this could indicate a large shift in profiles collectively. Similarly, the early diagnostic result can help with further data investigation to understand if the model on transaction data and on profiles is fit for the purpose of original training.

Often it is found that some data/profiles/customers will be reconstructed successfully, and others not so successfully: this can point to data that the model has not received in its training data or data that might have ETL data issues, or possibly point to manipulation of data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable medium containing instructions to configure one or more data processors to perform operations to enhance capabilities of a fraud detection computing system, the operations comprising:
   receiving, by a first autoencoder, historical customer transaction profile data input, representing past spending patterns of one or more customers;
   receiving by a second auto encoder, historical transaction data input, representing deviation of transactional behavior of the one or more customers from their peers;
   comparing the historical customer transaction profile and the historical transaction data inputs with data in a stored model to determine a likelihood of a fraudulent transaction or a fraudulent behavior; and
   sorting, based on a selection criterion, extracted original data sampling from the historical transaction data feeds into a plurality of partitions;
   encoding data inputs to one or more latent variables in at least one hidden layer of a neural network including the first autoencoder and the second autoencoder, such that quantity of the one or more latent variables is less than the quantity of the data inputs being input to the at least one input layer of the neural network, the one or more latent variables defining one or more first data patterns being different from one or more second data patterns of the stored model,
   the encoding of the data inputs comprises encoding at least an input x into a latent representation z, such that the input x can be reconstructed from z according to $z=\sigma(W_E x+b_E)$, where $W_E$ and $b_E$ are the encoding weights and bias, respectively, and $\sigma$ is the logistic function; and
   decoding the one or more latent variables to generate a reconstructed data set of the extracted original data sampling, the reconstructed data set comprising a quantity of data outputs to at least one output layer of the neural network,
   the decoding of the one or more latent variables reconstructs the input x according to $x=W_D z+b_D$;
   calculating a reconstruction error for at least one partition of the plurality of partitions utilizing the one or more latent variables, the reconstruction error representing a deviation of the quantity of data outputs of the reconstructed data set from the quantity of data inputs of the extracted original data sampling for the at least one partition;

calculating a total reconstruction error for the neural network based on combining the reconstruction error calculated for the plurality of partitions; and minimizing the reconstruction error, $E_R$, with respect to encoding and decoding parameters, $W_E$, $b_E$, $W_D$, $b_D$ on a training set by minimizing an associated loss function to correct the neural network misalignment based on a periodic check on the total reconstruction error on a selected sampled data set selected from a plurality of sample data sets, the selected sample data set having a lowest reconstruction error, wherein use of the stored model for detecting the fraudulent transaction or the fraudulent behavior by the fraud detection computing system is determined based on the one or more first data patterns and minimized reconstruction error, thereby improving scalability and fault-tolerance of the fraud detection computing system.

2. The non-transitory computer-readable medium in accordance with claim 1, wherein the stored model is in a go-live state, and wherein the historical learning of the stored model is in a fixed state.

3. The non-transitory computer-readable medium in accordance with claim 1, wherein the one or more customers includes a plurality of subpopulations, and wherein the operations of the neural network further comprise identifying an outlier of the reconstruction error associated with at least one of the plurality of subpopulations.

4. The non-transitory computer-readable medium in accordance with claim 3, wherein diagnostic operations of the neural network further comprise selecting, from a plurality of models stored by the analytics module, a best model according to a lowest reconstruction error for the outlier associated with the at least one of the plurality of subpopulations.

5. The non-transitory computer-readable medium in accordance with claim 1, wherein the stored model is an unsupervised model.

6. The non-transitory computer-readable medium in accordance with claim 1, wherein the stored model is a supervised model, and wherein the historical learning of the stored model includes human input data.

7. A computer-implemented method for enhancing capabilities of a fraud detection computing system, the operations comprising:

receiving, by a first autoencoder, historical customer transaction profile data input, representing past spending patterns of one or more customers;

receiving by a second auto encoder, historical transaction data input, representing deviation of transactional behavior of the one or more customers from their peers;

comparing the historical customer transaction profile and the historical transaction data inputs with data in a stored model to determine a likelihood of a fraudulent transaction or a fraudulent behavior; and sorting, based on a selection criterion, extracted original data sampling from the historical transaction data input into a plurality of partitions;

encoding data inputs to one or more latent variables in at least one hidden layer of a neural network including the first autoencoder and the second autoencoder, such that quantity of the one or more latent variables is less than the quantity of the data inputs being input to the at least one input layer of the neural network, the one or more latent variables defining one or more first data patterns being different from one or more second data patterns of a stored model, decoding the one or more latent variables to generate a reconstructed data set of the extracted original data sampling, the reconstructed data set comprising a quantity of data outputs output to at least one output layer of the neural network;

calculating a reconstruction error for at least one partition of the plurality of partitions utilizing the one or more latent variables, the reconstruction error representing a deviation of the quantity of data outputs of the reconstructed data set from the quantity of data inputs of the extracted original data sampling for the at least one partition;

calculating a total reconstruction error for the neural network based on combining the reconstruction error calculated for the plurality of partitions; and minimizing the reconstruction error, $E_R$, with respect to encoding and decoding parameters, $W_E$, $b_E$, $W_D$, $b_D$ on a training set by minimizing an associated loss function to correct the neural network misalignment based on a periodic check on the total reconstruction error on a selected sampled data set, selected from a plurality of sample data sets, the selected sample data set having a lowest reconstruction error, wherein use of the stored model for detecting the fraudulent transaction or the fraudulent behavior by the fraud detection computing system is determined based on the one or more first data patterns and minimized reconstruction error, thereby improving scalability and fault-tolerance of the fraud detection computing system.

8. The method in accordance with claim 7, wherein the one or more customers includes a plurality of subpopulations, and wherein the method further comprises identifying, by the at least one data processor, an outlier of the reconstruction error associated with at least one of the plurality of subpopulations.

9. The method in accordance with claim 7, wherein the encoding of the data input comprises encoding at least an input x into a latent representation z, such that the input x can be reconstructed from z according to $z=\sigma(W_E x+b_E)$, where $W_E$ and $b_E$ are the encoding weights and bias, respectively, and $\sigma$ is the logistic function.

10. The method in accordance with claim 7, wherein the decoding of the one or more latent variables reconstructs the input x according to $x=W_D z+b_D$.

11. A computer-implemented system for enhancing capabilities of a fraud detection computing system comprising:

at least one programmable processor; and a non-transitory machine-readable medium storing instructions that, when executed by the at least one programmable processor, cause the at least one programmable processor to perform operations comprising:

receiving at least one customer transaction profile and transaction data inputs associated with one or more customers;

comparing the customer transaction profile and transaction data inputs with a stored model of transactional behaviors to determine a likelihood of a fraudulent transaction based on the transaction data or a fraudulent behavior of at least one of the one or more customers based on the customer transaction profile, the stored model of transactional behaviors being developed based on historical data;

generating a score representing the likelihood of fraudulent transaction or a fraudulent behavior based on a historical learning of the stored model of transactional behaviors;

extracting an original data sampling from the received transaction data, the extracted original data sampling comprising a quantity of data inputs;

encoding the data inputs to one or more latent variables in at least one hidden layer of an auto-encoder neural network, the one or more latent variables defining one or more first data patterns being different from one or more second data patterns of the stored model, the auto-encoder neural network further sorting, based on a selection criterion, the extracted original data sampling into a plurality of partitions, the auto-encoder neural network further decoding the one or more latent variables to generate a reconstructed data set from the extracted original data sampling, the reconstructed data set comprising a quantity of data outputs output to at least one output layer of the auto-encoder neural network, the auto-encoder neural network further calculating a reconstruction error for at least one partition of the plurality of partitions utilizing the one or more latent variables, the auto-encoder neural network further calculating a total reconstruction error for the stored model of transactional behavior based on combining the reconstruction error for the plurality of partitions, selecting from a plurality of stored models of transactional behaviors a stored model of transactional behaviors having the lowest reconstruction error by minimizing an associated loss function, the auto-encoder neural network further signaling, based on the total reconstruction error satisfying a threshold, to update the stored model of transactional behaviors based on the received transaction data, wherein use of the stored model for detecting the fraudulent transaction or the fraudulent behavior by the fraud detection system is determined based on the one or more first data patterns and minimized reconstruction error, wherein the stored model of transactional behaviors is a supervised model, and wherein the historical learning of the stored model of transactional behaviors includes human input data.

12. The system in accordance with claim 11, wherein the model of transactional behaviors is in a go-live state, and wherein the historical learning of the model of transactional behaviors is in a fixed state.

13. The system in accordance with claim 11, wherein one or more customers includes a plurality of subpopulations, and wherein the auto-encoder neural network is further configured to identify an outlier of the reconstruction error associated with at least one of the plurality of subpopulations.

14. The system in accordance with claim 13, wherein the auto-encoder neural network is further configured to select a best model according to a lowest reconstruction error for the outlier associated with the at least one of the plurality of subpopulations.

15. The system in accordance with claim 11, wherein the model of transactional behaviors is an unsupervised model.

* * * * *